(No Model.)

A. WOOD.
BORING MILL.

No. 497,738. Patented May 16, 1893.

WITNESSES: W. H. Goulding, Rufus B. Fowler

INVENTOR: Austin Wood

UNITED STATES PATENT OFFICE.

AURIN WOOD, OF WORCESTER, MASSACHUSETTS.

BORING-MILL.

SPECIFICATION forming part of Letters Patent No. 497,738, dated May 16, 1893.

Application filed February 27, 1890. Serial No. 342,019. (No model.)

*To all whom it may concern:*

Be it known that I, AURIN WOOD, a citizen of the United States, and a resident of Worcester, in the county of Worcester and State of Massachusetts, have invented a new and useful Improvement in Boring-Mills, of which the following is a specification, reference being had to the accompanying drawings, in which—

Figure 1:
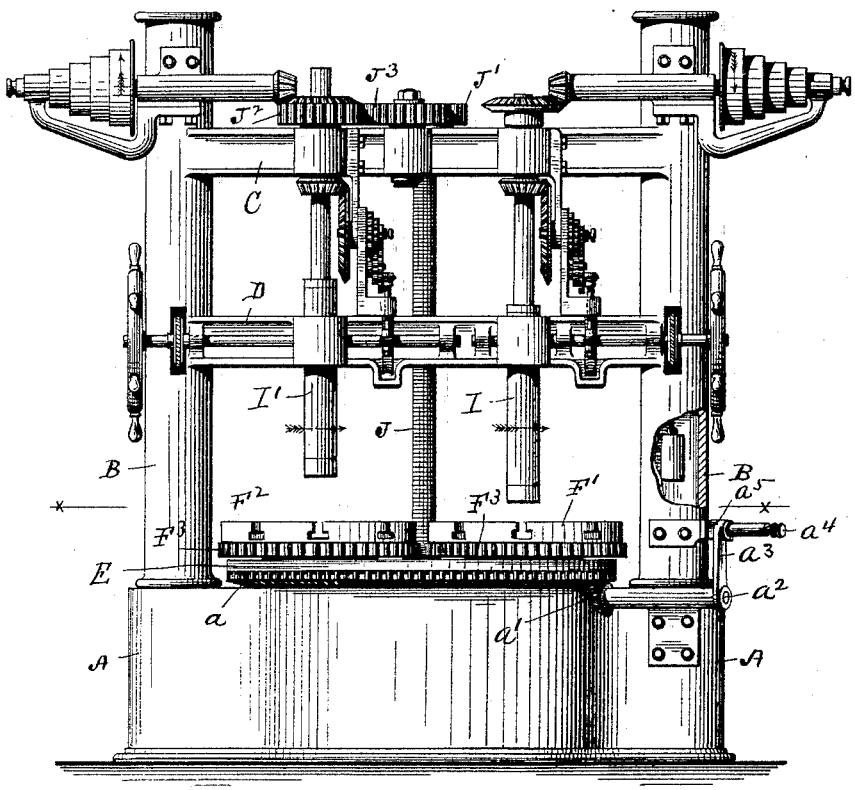
Figure 3:
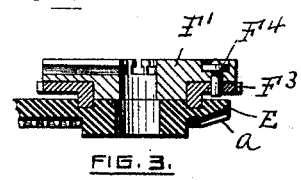
Figure 2:
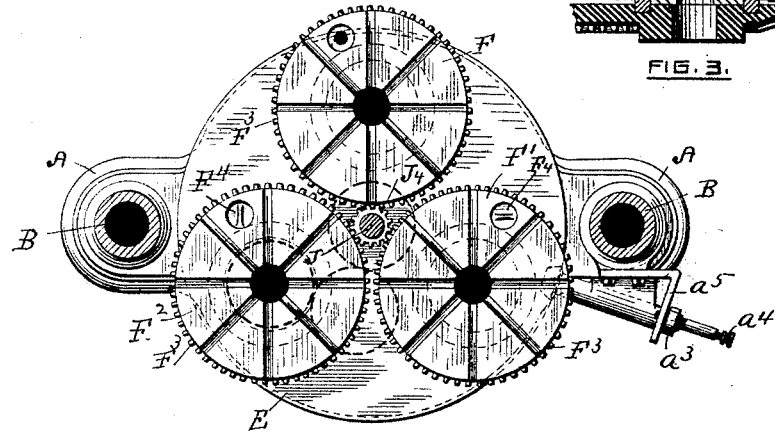

Figure 1 is a front view of a boring mill embodying my invention and with one of the supporting posts shown partly in section. Fig. 2 is a top view of the revolving table, the top of the machine having been removed on line X, X, Fig. 1. Fig. 3 is a vertical sectional view of one of the revolving face plates.

Similar letters refer to similar parts in the different figures.

My invention has for its object the more expeditious boring of pulleys, car-wheels and any class of work in which it is desirable to take more than a single "cut" and also to provide means by which the work may be arranged to be brought by a single movement in position to be operated upon by the boring tool, and these objects are accomplished by means of the construction and arrangement of the several operating parts as hereinafter described and specifically set forth in the annexed claims.

In the accompanying drawings, I have represented a boring mill in which two spindles are shown, each carrying a cutting tool.

The peculiar mechanism as represented by which the spindles carrying the cutting tools are rotated, or fed to the work forms no part of my present invention and therefore I have not illustrated the same in detail, and such portions of the machine only are hereinafter described as embody the essential features of my invention.

Referring to the accompanying drawings, A, A, denotes the base of the machine and B, B, vertical and parallel posts erected upon the base and connected together by the cross girths C and D.

Journaled upon the base A and revolving table E, having beneath its edge an annular gear $a$, through which the table is rotated by means of the beveled pinion $a'$ upon the crank-shaft $a^2$, which also carries the crank $a^3$. Within the crank handle is a sliding pin $a^4$, the end of which is caused to enter a notch in the arm $a^5$ attached to the upright post B. Upon the revolving table E, and equidistant from each other are the three revolving face plates F, F', F², journaled in the table E in a circle which is concentric with the axis of the table B. Each of the revolving face plates is provided with an annular gear F³, turning in a bearing around the face plates, except when they are connected with the face plates by the pins F⁴, which are held in the face plates and enter holes in the annular gears, causing the rotary motion of the gears to be imparted to the face plates.

Upon the cross girths C, D, are mounted the revolving spindles I, I', which, with their connected actuating and feeding mechanism are substantially the same as those now employed in upright drilling machines, and I have therefore not deemed it necessary to describe them in detail.

Journaled in bearings upon the cross girths C, D, is a vertical shaft J, with its axis coincident with the axis of the revolving table E. To the upper end of the shaft J, is attached a spur gear wheel J', through which rotary motion is given to the shaft J by means of the gear wheel J² upon one of the revolving spindles I, and an intermediate gear wheel J³, turning upon a stud held in the girth C. Upon the lower end of the shaft J, is a pinion J⁴, in mesh with the three annular gears F, F', F². Uniform rotary motion is thus imparted to each of the annular gears and their connected face plates and in a direction opposite to that of the cutting tools carried by the revolving spindles I, I'. The number of teeth in the annular gear $a$, attached to the revolving table E should be a multiple of the number of teeth in the beveled pinion $a'$ and also divisible by three, so a stated number of revolutions of the crank shaft $a^2$ will turn the table E one third of a revolution.

In Fig. 2 the face plates F', F² are brought into position with their centers coincident with the axes of the rotating spindles I, I', so any work attached to the face plates F', F², and concentrically with their axes will be brought in proper position to be bored simultaneously by the cutting tools carried by the two revolving spindles I, I'. During the time of boring the work upon the face plates F', F², additional work can be arranged upon the face plate F, by withdrawing the pin $E^4$ and disconnecting the face plate from its annular gear. A new piece of work is thus arranged upon the face plate F concentric with its axis of rotation, which is readily determined by the rotation of the face plate. The pin $E^4$ is then replaced connecting the face plate with its annular gear and securing the rotation of the face plate by means of the connected actuating mechanism. When the operation of boring the pieces of work held upon the face plates $F'$, $F^2$ is completed the table E is rotated one third of a revolution and the face plate F is brought into the position of $F'$, face plate $F'$ is carried into the position of $F^2$ and face plate $F^2$ is brought into position of face plate F, allowing the completed piece of work to be removed and a new piece attached and the operation repeated. Two pieces are thus bored simultaneously while a third piece is being attached to the third face plate. The use of the three face plates is only required in case the two operations of boring is to be done upon the same piece of work, otherwise but one revolving spindle is required and two face plates can be used placed upon opposite sides of the revolving table, which in that case will be revolved but one-half a revolution at each operation of boring. This duplication of the face plates materially increases the capacity of the machine as it obviates the necessity of stopping the operation of boring for the purpose of adjusting the work.

What I claim as my invention, and desire to secure by Letters Patent, is—

1. An organized machine for boring, consisting of a revolving spindle carrying a cutting tool, and capable of a sliding, or feeding, motion and a revolving face plate with its axis eccentric with the axis of the tool carrying spindle and connected means, substantially as described, by which said tool carrying spindle and face plate are revolved in opposite directions, as and for the purpose set forth.

2. In a boring mill, the combination with a revolving table, and a revolving spindle carrying a cutting tool, said spindle being parallel with the axis of said revolving table, of two or more face plates journaled on said revolving table so the center of said face plates can be successively brought into alignment with the axis of the revolving spindle as the table is rotated, substantially as described.

3. In a boring machine the combination of a rotating table, one, or more rotating drill spindles parallel with the axis of said table, one or more face plates arranged eccentrically on said table and at the same radial distance from the center of the table as the revolving spindles, annular gears turning in bearings around said face plates and having means, substantially as described, whereby said gears and said face plates are united, and a central actuating shaft with a pinion engaging said annular gears, substantially as described.

4. In a boring mill, the combination of a revolving spindle carrying a boring tool, a revolving table upon which the work is supported and having its axis at one side of the axis of said revolving spindle, a locking mechanism operatively connected with said table by which each revolution of the table is divided into two, or more equal movements and means whereby the work is adjustably attached to said table to correspond with said equal angular movement as determined by said locking mechanism, substantially as described.

Dated at Worcester, in the county of Worcester and State of Massachusetts, this 15th day of February, 1890.

AURIN WOOD.

Witnesses
 W. H. GOULDING,
 RUFUS B. FOWLER.